(12) United States Patent
Sugiura

(10) Patent No.: US 6,923,501 B2
(45) Date of Patent: Aug. 2, 2005

(54) VEHICLE SUNROOF STRUCTURE

(75) Inventor: Takumi Sugiura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/671,246

(22) Filed: Sep. 24, 2003

(65) Prior Publication Data

US 2004/0061359 A1 Apr. 1, 2004

(30) Foreign Application Priority Data

Sep. 27, 2002 (JP) ........................................ 2002-283865

(51) Int. Cl.$^7$ ................................................ B60J 7/00
(52) U.S. Cl. ........................................................ 296/214
(58) Field of Search ........................................ 296/214

(56) References Cited

U.S. PATENT DOCUMENTS

| 4,056,274 A | * | 11/1977 | Jardin et al. ................. 296/223 |
| 6,179,034 B1 | * | 1/2001 | Fuss ........................... 160/105 |
| 6,315,356 B1 | * | 11/2001 | Tolinski ...................... 296/214 |
| 6,729,074 B1 | * | 5/2004 | Huisman et al. ............. 49/413 |

FOREIGN PATENT DOCUMENTS

| FR | 1108992 | * | 1/1956 | ................. 296/214 |
| JP | 7-35139 S | | 6/1995 | |

* cited by examiner

Primary Examiner—Dennis H. Pedder
(74) Attorney, Agent, or Firm—Darby & Darby

(57) ABSTRACT

It is to construct a vehicle body and a sunroof apparatus so that a sunshade can be inserted to and removed from the front or rear of a shade sliding rail. Thus, during a state in which the sunroof apparatus is assembled to the vehicle body, the sunshade freely comes in and out from the front or rear of a sunroof apparatus.

24 Claims, 6 Drawing Sheets

VEHICLE SUNROOF STRUCTURE

BACKGROUND OF THE INVENTION

The present invention relates to a vehicle sunroof structure having a sunshade that is movable in a longitudinal direction.

Hitherto, there is known such a kind of the vehicle sunroof structure having a pair of left and right frame portions respectively extending longitudinally on left and right peripheral edge portions of a roof opening, a front cross member for connecting front ends of frame portions, and a motor fixed to a roof panel side through a bracket (see Patent Document 1 (to be described later)). In each of the frame portions, formed are a lid sliding rail for guiding a drive member engaging a sunroof lid and a shade sliding rail for guiding a sunshade. A motor is disposed behind each of the frame portions, and drives the drive member.

However, in the case of the vehicle sunroof structure, the frame portions and the front cross member constitute a nearly-U-shaped portion. Thus, the sunroof structure has problems in that a stiffness of a rear-side part of each of the frame portions is low, and that consequently, deformation is liable to occur therein.

Structure having a rear cross member for connecting rear ends of the frame portions is known as a vehicle sunroof structure that solved such problems. The structure drastically increases the stiffness of the rear-side part of each of the frame portions. The rear cross member is fastened and fixed to a lower part of each of the frame portions.

In the vehicle sunroof structure, a motor for driving a sunroof lid is disposed behind a lid sliding rail and a shade sliding rail. Further, a vehicle roof member extending laterally is placed behind the motor.

[Patent Document 1]

The Unexamined Japanese Patent Utility Model Application Publication No. Hei7-35139.

However, in the vehicle sunroof structure, the motor and the roof member are placed behind the shade sliding rail. Thus, when a sunroof apparatus including the frame portions is incorporated into a vehicle body, a moving path of the sunshade is closed by the motor and the roof member. This disables insertion and removal of the sunshade.

Therefore, when a vehicle is manufactured, the sunroof apparatus is incorporated into the vehicle body under a condition in which the sunshade is preliminarily built into the sunroof apparatus. That is, operations of incorporating the sunroof apparatus into the vehicle body and of assembling the vehicle body are performed in a manufacturing facility under a condition in which the sunshade is built thereinto. Consequently, the vehicle sunroof structure has problems in that oil or the like adheres to and fouls the sunshade. Moreover, in the case that an age-deterioration of the sunshade is caused during a long-term use of the vehicle, for example, the motor should be dismounted in such a way as to be able to remove the sunshade. Consequently, the sunroof structure has a problem in that the sunshade cannot easily be replaced.

SUMMARY OF THE INVENTION

The invention is accomplished in view of aforementioned circumstances. Accordingly, an object of the invention is to provide a vehicle sunroof structure facilitating the insertion and removal of a sunshade to thereby prevent the sunshade from being fouled when manufactured, and thereby facilitate the replacement of the sunshade.

To achieve the foregoing object, according to the invention, there is provided a vehicle sunroof structure (hereunder referred to as a first vehicle sunroof structure) configured by assembling a sunroof apparatus, which has a pair of left and right frame portions provided on peripheral edges of a roof opening and also has a shade sliding rail for guiding a sunshade formed in each of the frame portions in a longitudinal direction, to a vehicle body. In the vehicle sunroof structure, the vehicle body and the sunroof apparatus are configured so that the sunshade is freely inserted to and removed from front or rear of a shade sliding rail during a state in which the sunroof apparatus is incorporated into the vehicle body.

According to the first vehicle sunroof structure, a space, into which the sunshade is inserted, and from which the sunshade is removed, is defined longitudinally of the shade sliding rail. The sunshade can be inserted into or removed from the shade sliding rail without interfering with various kinds of parts or members of the sunroof apparatus. Incidentally, for example, in the case that a roof trim is placed in the sunshade insertion/removal space, the sunshade can be inserted or removed by removing the roof trim from the vehicle body.

Consequently, the sunshade can be inserted from the front or rear of each of the frame portions after the sunroof apparatus including the frame portions is assembled to the vehicle body. On a vehicle manufacturing line, the sunshade can be attached to the sunroof apparatus upon completion of assembling the sunroof apparatus. Moreover, the sunshade can easily be replaced during a state in which the sunroof apparatus is assembled to the vehicle.

Therefore, there is no necessity for performing an operation of assembling the vehicle body of the sunroof apparatus where the sunshade is preliminarily attached thereto. In a factory, a step of attaching the sunshade can be adapted to be performed downstream of a step of assembling the sunroof apparatus to the vehicle body. That is, the sunshade can be prevented from being fouled at each of the steps of assembling the sunshade.

Further, even in the case that the sunshade age-deteriorates as a result of long-term use of a motor vehicle, the sunshade can be replaced without detaching various kinds of parts. Consequently, the maintainability of the vehicle can be enhanced.

According to an embodiment (hereunder referred to as a second vehicle sunroof structure) of the first vehicle sunroof structure, a roof member disposed longitudinally of a roof opening of the vehicle body and extending laterally is placed above a space through which the sunshade passes when inserted thereto or removed therefrom.

The second sunroof structure has advantages in that because the vehicle-body-side roof member is placed above the space through the sunshade passes when inserted thereto or removed therefrom, an interference between the sunshade and the roof member is avoided when the sunshade is inserted or removed, in addition to the advantages of the first vehicle sunroof structure.

In this case, it is preferable that the shade sliding rail is formed in such a way as to be downwardly concave, and that the space, through which the sunshade passes when inserted or removed, is defined in such a way as to extend obliquely downwardly to the front end or the rear end thereof. With such configuration, dead space in a vehicle interior can be reduced even when the sunroof apparatus and the roof member are located nearly at a same height. Molding of the vehicle is not constrained.

According to an embodiment (hereunder referred to as a third vehicle sunroof structure) of the first or second vehicle sunroof structure, a motor for driving a sunroof lid is disposed above a moving locus of the sunshade.

According to an embodiment (hereunder referred to as a fourth vehicle sunroof structure) of the third vehicle sunroof structure, the motor is disposed above a forefront position or a rearmost position, to which the sunshade is guided by the shade sliding rail.

The third and fourth vehicle sunroof structures have an advantage that because the motor is placed above the moving locus of the sunshade, the interference between the sunshade and the roof member is avoided when the sunshade is inserted or removed, in addition to the advantages of the first or second vehicle sunroof structure.

Further, because the motor is placed above the shade sliding rail, the members of the sunroof are not positioned at an outer place in a longitudinal direction from the front end or the rear end of the shade sliding rail. Thus, the sunroof can be constituted in such a way as to be short in the longitudinal directions.

In this case, it is preferable that the shade sliding rail is formed in such a way as to be downwardly concave, and that the space, through which the sunshade passes when inserted or removed, is defined in such a way as to extend obliquely downwardly to the front end or the rear end thereof. With such configuration, a space, in which the motor can be installed, is defined above the front end or the rear end of the shade sliding rail, the motor can be installed can be installed without generating large dead space in a vehicle interior.

According to an embodiment (hereunder referred to as a fifth vehicle sunroof structure) of the third or fourth vehicle sunroof structure, a lid sliding rail for guiding the sunroof lid is formed on each of the frame portions. At least one of a front end and a rear end of each of the frame portions is positioned so that an end portion of the lid sliding rail is positioned on a central portion in a longitudinal direction from an end portion of the shade sliding rail. The motor is placed on an outward side in a longitudinal direction from an end portion of the lid sliding rail.

The fifth vehicle sunroof structure has an advantage that at least one set of front ends or one set of rear ends of the lid sliding rail and the shade sliding rail has separate positions, in addition to the advantages of the third or fourth vehicle sunroof structure. The lengths of the rails respectively needed for moving the sunroof lid and the sunshade in the longitudinal direction are separately ensured.

Furthermore, the end portion of the lid sliding rail is placed to a central place in the longitudinal direction from the end portion of the shade sliding rail. The motor for driving the sunroof lid is disposed to an outer place in the longitudinal direction from the end portion of the lid sliding rail. Thus, the interference between the motor and the sunshade can be avoided without hindrance to the driving of the sunroof lid by the motor.

Consequently, the motor is located at an outer place in the longitudinal direction of the end portion of the lid sliding rail. Thus, the motor does not project upwardly. The dimension in the vertical direction of the sunroof does not become large. That is, the space needed for the sunroof in the vehicle can be reduced. That is, a large space for passengers can be ensured.

According to an embodiment (hereunder referred to as a sixth vehicle sunroof structure) of the fifth vehicle sunroof structure, the lid sliding rail is formed separately from the shade sliding rail.

According to the sixth vehicle sunroof structure, the sliding rails are separately formed, so that the loci in the longitudinal direction of the sliding rails can be set independent from each other.

Hence, the sunshade insertion/removal space is ensured. Further, the shade sliding rail is formed so that the rearmost position of the sunshade becomes a more rearward position, while the lid sliding rail can be formed independent from the shade sliding rail. That is, the position of the front end of the sunshade, of which rear end is at the rearmost position, is located at a more rearward place by setting the rearmost position of the sunshade to be a more rearward one. Thus, the rear peripheral edge of the roof opening can be set to be rearwardly enlarged. Furthermore, the designing of an optimum lid sliding rail, that is, the designing of an optimum shape thereof for guiding the sunroof lid, and of a shape enabling the vehicle to ensure a larger indoor space, can be performed.

According to an embodiment thereunder referred to as a seventh vehicle sunroof structure) of one of the first to sixth vehicle sunroof structures, a cross member, which connects at least one set of front sides or one set of rear sides of frame portions and extends laterally, strides over the shade sliding rail and is placed above a moving locus of the sunshade.

The seventh vehicle sunroof structure has advantages in that because the cross member strides over each of the rails and is placed above the moving locus of the sunshade, the sunshade can be inserted or removed from the front or rear of each of the frame portions without interfering with the cross member even when the cross member is assembled to each of the frame portions, in addition to the advantages of one of the first to sixth vehicle sunroof structures.

Consequently, after the cross member is assembled to each of the frame portions, the sunshade can be inserted from the front or rear of each of the frame portions. On a vehicle manufacturing line, the sunshade can be attached to the sunroof apparatus upon completion of assembling the cross member. Moreover, the sunshade can easily be replaced during a state in which the sunroof apparatus is assembled to the vehicle.

Thus, there is no need for performing an operation of assembling the sunroof apparatus to the vehicle body during a state in which the sunshade is preliminarily attached thereto. In a factory, a step of attaching the sunshade can be adapted to be performed downstream of a step of assembling the sunroof apparatus to the vehicle body. That is, the sunshade can be prevented from being fouled at each of the steps of assembling the sunshade.

Further, even in the case that the sunshade age-deteriorates as a result of long-term use of a motor vehicle, the sunshade can be replaced without detaching various kinds of parts. Consequently, the maintainability of the vehicle can be enhanced.

BRIEF DESCRIPTION OF THE DRAWINGS

FIG. 7A is a view illustrating a state in which a rear-end side part of a root trim is fixed to a rear rail by a clip; and FIG. 7B is a view illustrating a state in which the engagement between the roof trim and the rear rail is cancelled.

DETAILED DESCRIPTION OF THE INVENTION

Figure 1:
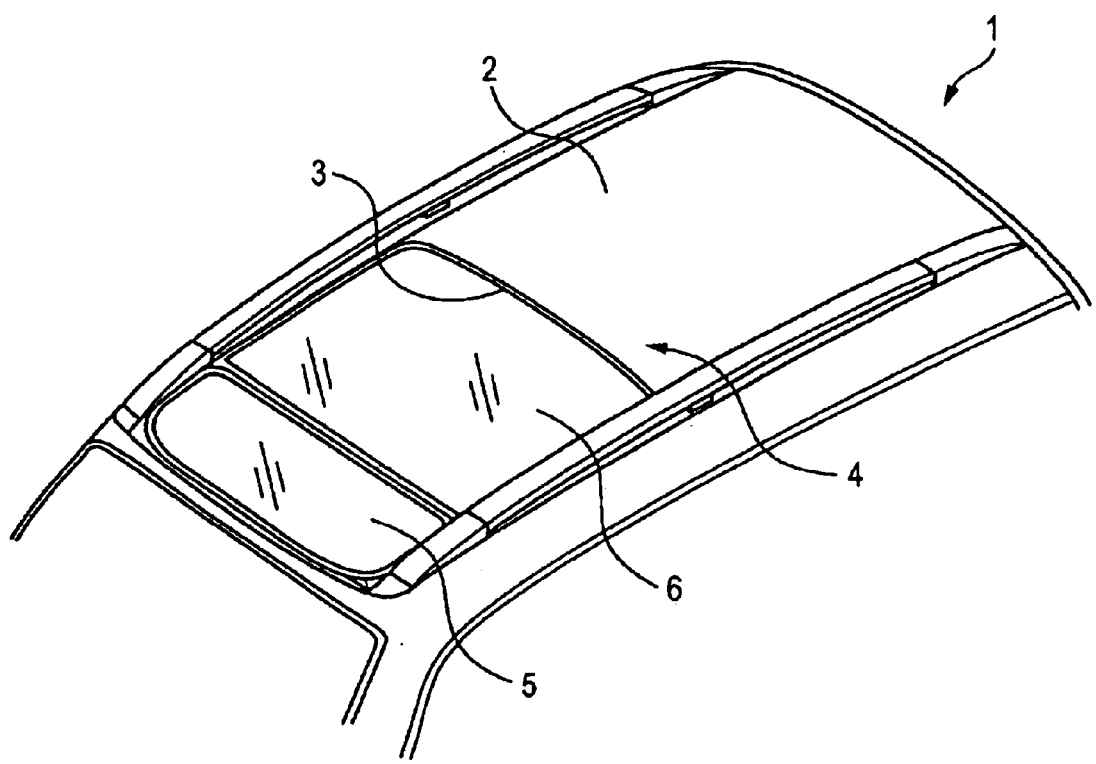
FIG. 1 shows an embodiment of the invention, and is an external perspective view illustrating a roof of a vehicle having a sunroof apparatus, and also illustrating a portion provided therearound.
Figure 2:
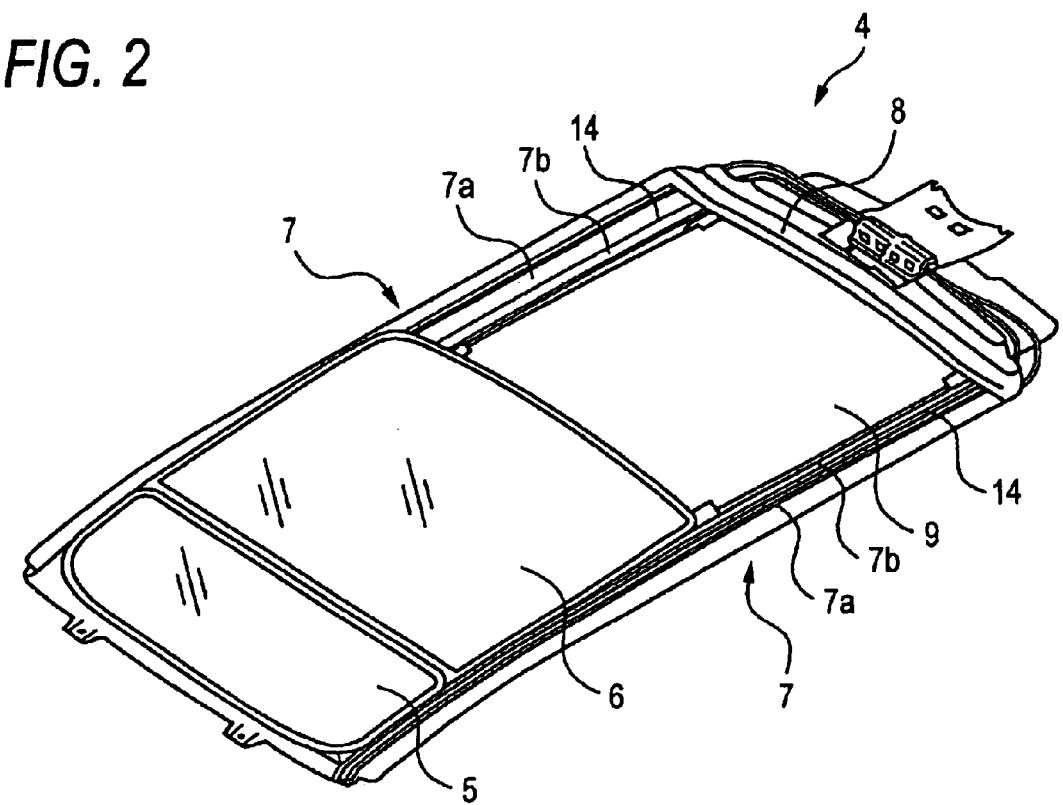
FIG. 2 is an external perspective view illustrating the sunroof apparatus where a front lid and a rear lid are closed.
Figure 3:
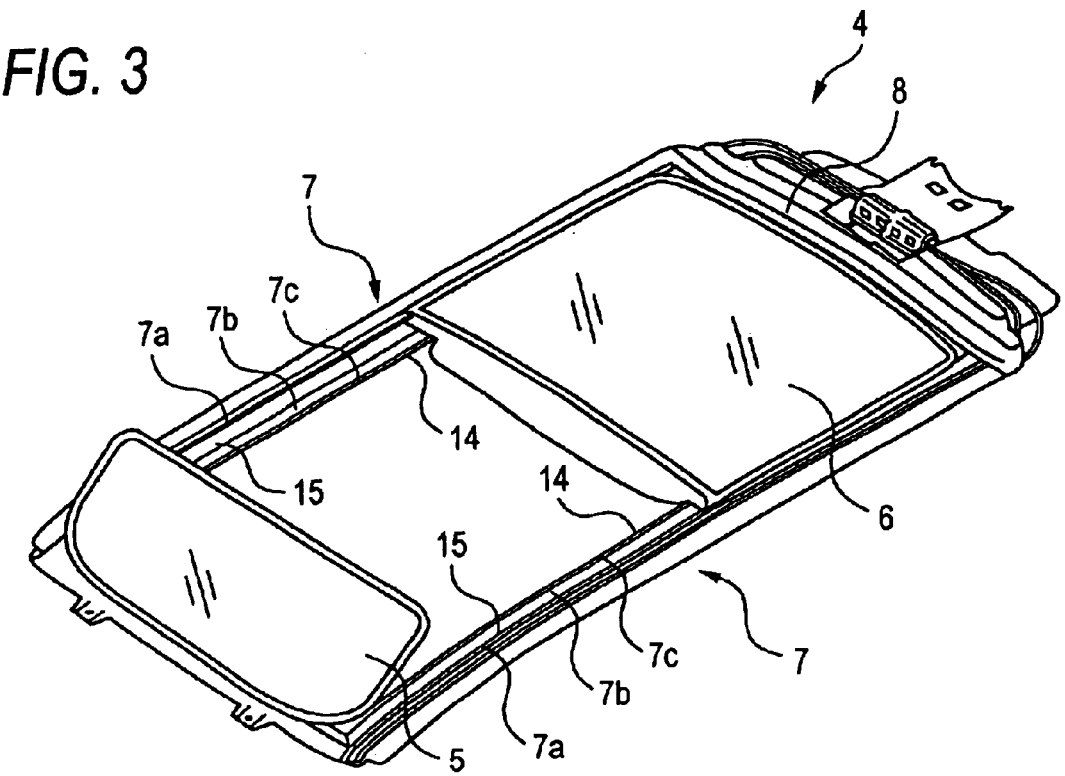
FIG. 3 is an external perspective view illustrating the sunroof apparatus where the front lid and the rear lid are opened.
Figure 4:
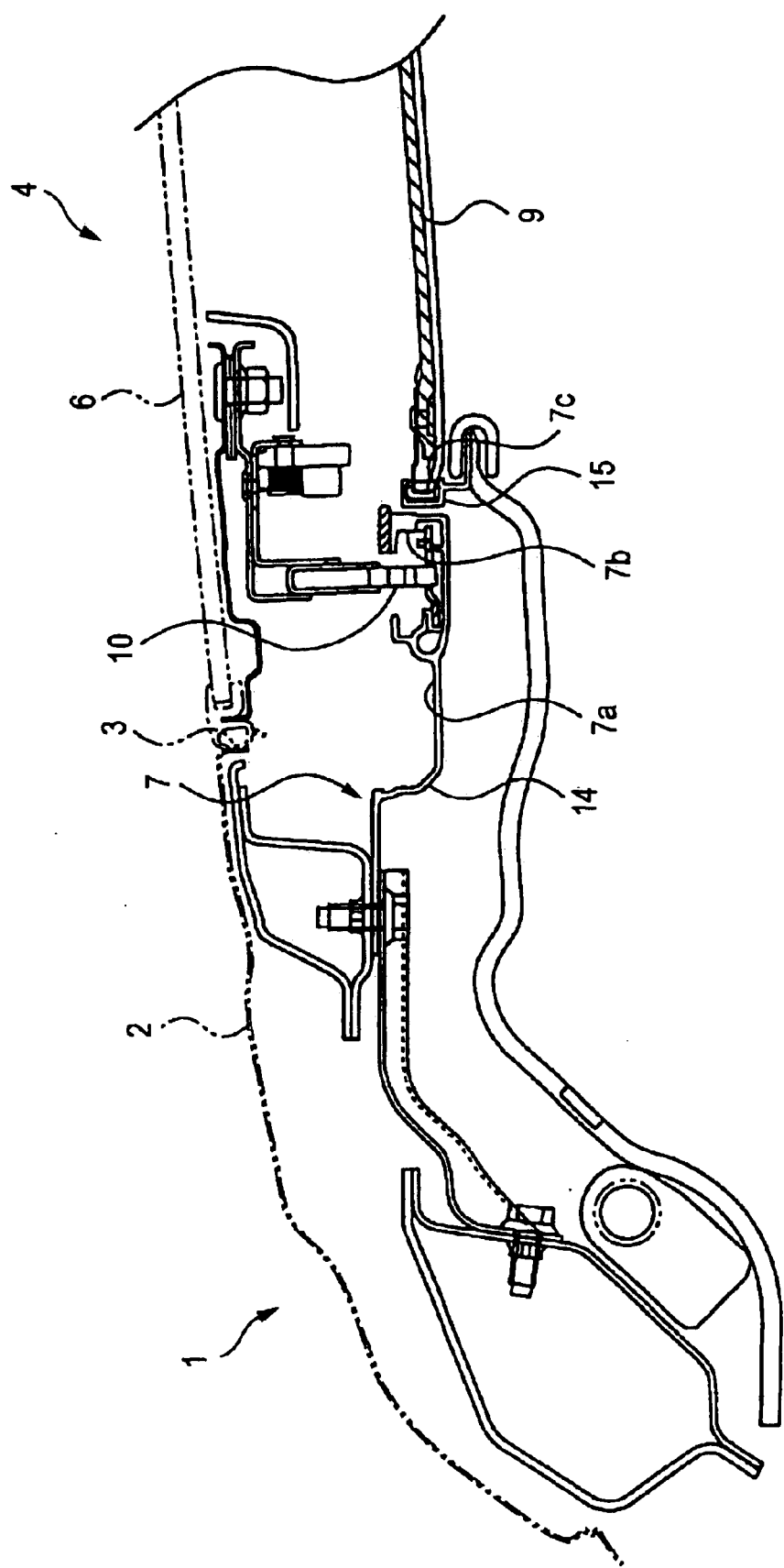
FIG. 4 is a partly front sectional explanatory view illustrating a portion, in which the rear lid is installed, of a sunroof structure where the sunroof is incorporated into a vehicle body.
Figure 5:
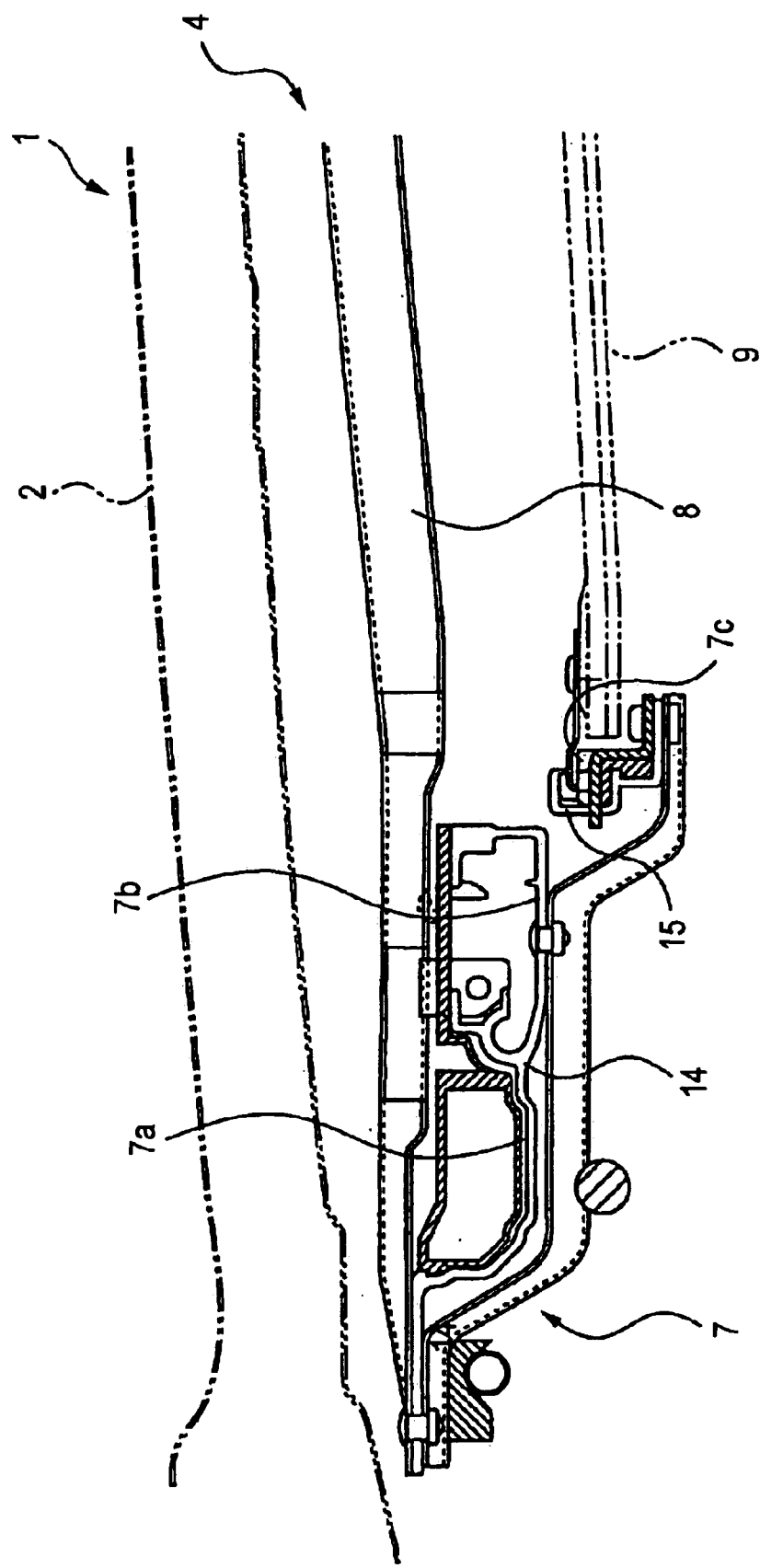
FIG. 5 is a partly front sectional explanatory view illustrating a portion, in which the rear lid is installed, of the sunroof structure where a cross member is incorporated into the vehicle body.
Figure 6:
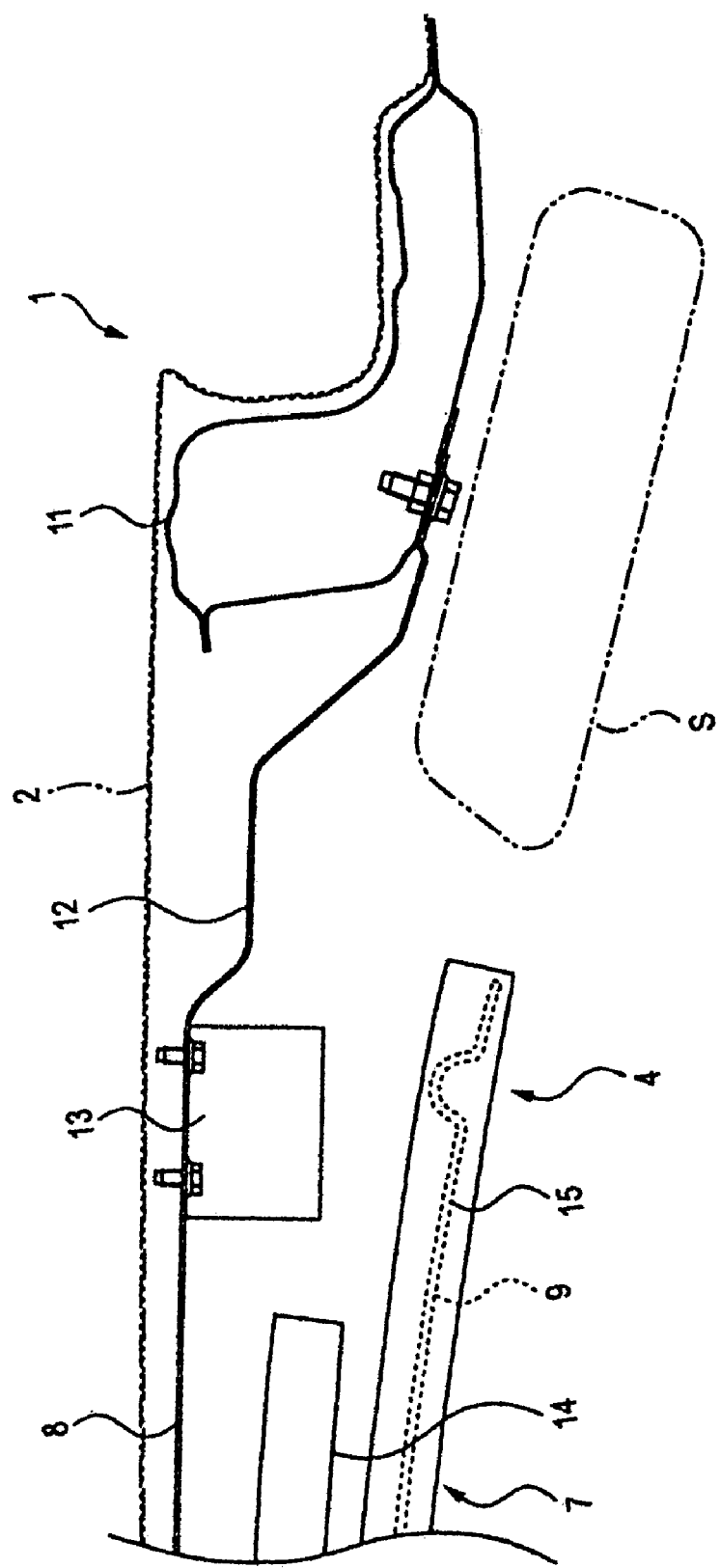
FIG. 6 is a partly side sectional explanatory view illustrating the sunroof structure where a cross member is incorporated into the vehicle body.
Figure 7A:
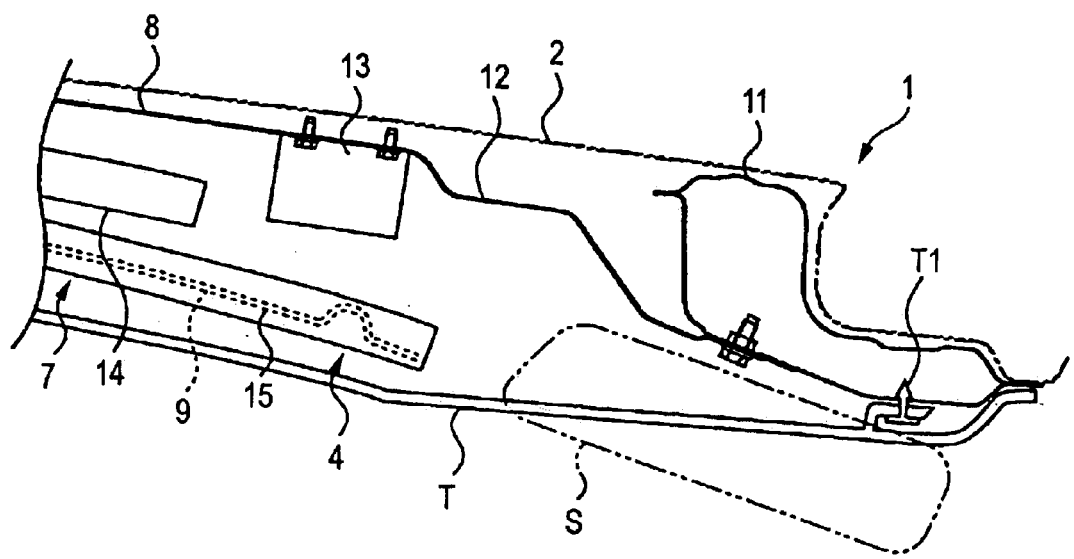
FIGS. 7A and 7B are partly side sectional explanatory views each illustrating the sunroof structure where a cross member is incorporated into the vehicle body.
Figure 7B:
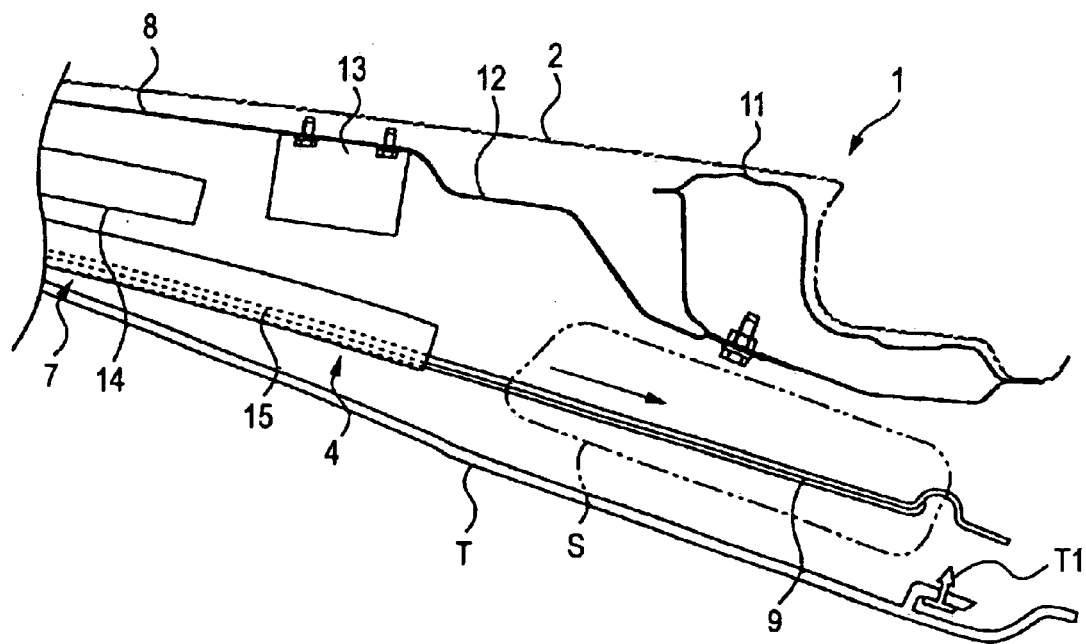

FIGS. 1 to 7B show an embodiment of the invention. FIG. 1 is an external perspective view illustrating a roof of a vehicle having a sunroof apparatus, and also illustrating a portion provided therearound. FIG. 2 is an external perspective view illustrating the sunroof apparatus where a front lid and a rear lid are closed. FIG. 3 is an external perspective view illustrating the sunroof apparatus where the front lid and the rear lid are opened. FIGS. 4 and 5 are partly front sectional explanatory views each illustrating a sunroof structure where the sunroof is incorporated into a vehicle body. FIGS. 6, 7A and 7B are partly side sectional explanatory views each illustrating the sunroof structure where a cross member is incorporated into the vehicle body.

As shown in FIG. 1, the motor vehicle 1 is of the wagon type. Sunroof apparatus 4 is provided in a roof opening 3 of a roof panel 2. The sunroof apparatus 4 has a nearly-rectangular front lid 5 for opening and closing the front side of a roof opening 3, and also has a rear lid 6 for opening and closing the rear side of the roof opening 3 so that the lids 5 and 6 connect each other.

As shown in FIG. 2, the front lid 5 is attached to a roof panel 2 in such a way as to be freely turnable around the front side thereof. As shown in FIG. 3, the front lid 5 is configured so that the rear portion thereof is upwardly moved to thereby open the front part of the roof opening 3. Incidentally, in this embodiment, the center of turn of the front lid 5 is adapted to be slightly moved in a longitudinal direction. As the front end of the front lid 5 rearwardly moves, the rear end thereof upwardly moves.

As shown in FIG. 2, the rear lid 6 is attached to the roof panel 2 in such a way as to slide-move in a longitudinal direction. As shown in FIG. 3, the rear lid 6 rearwardly slide-moves to thereby open the rear part of the roof opening 3. In this embodiment, the rear lid 6 is set into an open state after the front lid 5 is set into an open state. Further, the front lid 5 is brought into a closed state after the rear lid 6 is set into a closed state.

As shown in FIG. 2, the sunroof apparatus 4 has a pair of left and right frame portions 7 respectively extending along the left and right peripheral edges of the roof opening 3, and also has a cross member 8 connecting the rear ends of the left and right frame portions 7 to each other. As shown in FIG. 3, in each of the left and right frame portions 7, a drain groove 7a for drainage, a lid sliding rail 7b for driving each of the lids 5 and 6, and a shade sliding rail 7c for guiding the sunshade 9 in the longitudinal direction are formed in this order from the outside thereof.

As shown in FIG. 4, each of the drain groove 7a and the lid sliding rail 7b is formed in such a manner as to have a concave section. The drain groove 7a receives drain water flowing into a vehicle interior from the peripheral edge of the roof opening 3, and leads the drain water to the outside of the vehicle. Further, a drive member 10, adapted to move in a longitudinal direction, for driving the front lid 5 and the rear lid 6 is arranged on the lid sliding rail 7b. The drive member 10 is moved by a motor 13 installed on the bottom surface of a bracket 12 provided in such a way as to hang across the cross member 8 and a rear rail 11 of the vehicle body.

In this embodiment, the drive member 10 moves on the lid sliding rail 7b in a longitudinal direction. The drive member 10 engages the front lid 5 at the front of the lid sliding rail 7b, and also engages the rear lid 6 at the rear of the lid sliding rail 7b. The drive member 10 moves in a longitudinal direction during a state, in which the drive member 10 engages the lid 5 or 6, to thereby drive the lids 5 and 6 in such a manner as to open and close the lids 5 and 6. That is, when the drive member 10 moves from the front side to the rear side, the front lid 5 and the rear lid 6 are opened in this order. When the drive member 10 moves from the rear side to the front side, the front lid 6 and the rear lid 5 are closed in this order.

As shown in FIGS. 4 and 5, the shade sliding rail 7c is formed like a flange nearly horizontally projecting leftwardly and rightwardly inwardly. The left and right end portions of the sunshade 9 are longitudinally slidable put on the flange-like portion. In this embodiment, the sunshade 9 is operated by the passenger to thereby move in a longitudinal direction.

Each of the left and right frame portions 7 of this embodiment is configured by being divided into a lid rail member 14, in which the drain groove 7a and the lid sliding rail 7b are formed, and a shade rail member 15 in which the shade sliding rail 7c is formed. In this embodiment, the cross member 8 connects the left and right lid rail members 14 and the left and right shade rail members 15, as illustrated in FIG. 5.

As shown in FIG. 6, the rear end of each of the lid rail members 14 is disposed forwardly of the rear end of each of the shade rail members 15. That is, the rear ends of the lid slide rail 7b and the shade sliding rail 7c have discrete positions, respectively. The lengths of the rails 7b and 7c needed for moving the lids 5 and 6 and the sunshade 9 in a longitudinal direction are discretely ensured.

Further, the lid rail members 14 and the shade rail members 15 are formed by being bent in such a way as to be downwardly concave when seen in a side view thereof. Each of the lid rail members 14 is formed so that the curvature of a part thereof corresponding to a zone, in which the drive member drives the front lid 5, differs from the curvature of another part thereof corresponding to a zone, in which the drive member drives the rear lid 6. Furthermore, each of the shade rail members 15 is formed in such a way as to have a nearly uniform curvature in a longitudinal direction.

As shown in FIG. 6, the shade rail member 15 is configured so that the height of the rear end thereof is lower than the height of the lid rail member 14. Further, the shade rail member 15 is configured so that the height of a central part in the longitudinal direction is larger than the height of the lid rail member 14. The motor 13, the bracket 12, and the rear rail 11 are placed behind the lid rail member 14. That is, in this embodiment, the rear end portion of each of the left and right frame portions 7 is configured so that the end portion of the lid sliding rail 7b is placed forwardly of (that is, at the central portion in the longitudinal direction of) the end of the shade sliding rail 7c. The motor 13 is disposed behind (that is, at the outer place in the longitudinal direction of) the end portion of the lid sliding rail 7b. Furthermore, the motor 13 is placed above the rear end side of each of the shade rail members 15.

The rear rail 11 serving as a roof member is provided along the upper part of the back-surface-side opening portion of the motor vehicle 1. Incidentally, the rear rail 11 is ordinarily provided in the motor vehicle 1. Thus, the rear rail 11 is not described in detail herein. The bracket 12 is welded to a central portion in the lateral direction of the cross member 8, and fastened and fixed to the bottom surface of the rear rail 11. The motor 13 is attached to the bracket 12 by bolts. Incidentally, the bracket 12 is tilted downwardly and rearwardly behind a portion, to which the motor 13 is attached, and fixed to the bottom surface of the rear rail 11 having a height nearly equal to that of the lid rail member 14.

Thus, the motor 13 is placed above the moving locus of the sunshade 9. Especially, in this embodiment, the motor 13 is placed above the rearmost position of the sunshade 9, as illustrated in FIG. 6. Further, this embodiment is configured so that the parts fixed to the vehicle body and the parts provided in the sunroof apparatus 4 are not present behind the shade sliding rail 7c. That is, the vehicle body and the sunroof apparatus 4 are configured so that the sunshade 9 is freely inserted thereto and removed therefrom from behind the shade sliding rail 7c during a state in which the sunroof apparatus 4 is incorporated into the vehicle body. Thus, a sunshade insertion/removal space S serving as a space, through which the sunshade 9 when inserted and removed, is defined. In this embodiment, when the vehicle is manufactured, a roof trim T is attached to the bottom portion of the shade sliding rail 7c after the sunroof apparatus 4 is assembled to the vehicle body, as shown in FIG. 7A. The roof trim T is detachably fixed to the bottom portion of the rear rail 11 by a clip T1. When the clip T1 is removed, a-rear side portion of the roof trim T downwardly bends, as shown in FIG. 7B. Further, when a stopper (not shown) for the sunshade is removed, the insertion and removal of the sunshade 9 from behind the rail 7c are enabled.

In this embodiment, the shade sliding rail 7c is formed in such a way as to be downwardly concave, as shown in FIG. 7A. The end portion thereof obliquely and downwardly extends. Thus, the sunshade insertion/removal space S is also defined in such a way as to obliquely and downwardly extend. The rear rail 11 disposed behind the roof opening 3 and extending laterally is placed above the sunshade insertion/removal space S.

According to the vehicle sunroof structure configured as described above, the sunshade insertion/removal space S is defined behind the shade sliding rail 7c. Thus, the sunshade 9 can be inserted into the shade sliding rail 7c or removed from the shade sliding rail 7c without interfering with the vehicle body, and various kinds of parts and members of the sunroof apparatus 4.

Concretely, the rear rail attached to the vehicle body is placed above the sunshade insertion/removal space S. Thus, when the insertion or removal of the sunshade 9 is performed, the interference between the sunshade 9 and the rear rail 11 is avoided. Further, because the cross member 8 is disposed above the moving locus of the sunshade 9 in such a way as to stride over the shade sliding rail 7c, the interference between the sunshade 9 and the cross member 8 is avoided when the insertion or removal of the sunshade 9 is performed.

In this embodiment, the shade sliding rail 7c is formed in such a manner as to be downwardly concave. The sunshade insertion/removal space S is defined at the rear end of the rail 7c in such a way as to obliquely and downwardly extend therefrom. Thus, even when the sunroof apparatus 4 and the rear rail 11 are located nearly at an equal height as shown in FIG. 7A, dead space in the vehicle interior can be reduced. Molding of the vehicle is not constrained. Further, a space, in which the motor 13 can be installed, is defined above the rear end of the shade sliding rail 7c. Consequently, the motor 13 can be installed without generating large dead space in the vehicle interior.

Further, the end portion of the lid sliding rail 7b is placed to the central part in the longitudinal direction from the end portion of the shade sliding rail 7c. The motor 13 for driving each of the lids 5 and 6 is disposed to the outer side in the longitudinal direction of the end portion of the lid sliding rail 7b. Therefore, the interference between the motor 13 and the sunshade 9 is avoided without hindrance to the driving of the lids 5 and 6 by the motor 13.

Thus, the vehicle sunroof structure according to this embodiment eliminates the necessity for assembling the sunroof apparatus 4 to the vehicle body during a state in which the sunshade 9 is preliminarily attached thereto. In a factory, the step of attaching the sunshade 9 can be adapted to be performed downstream of the step of assembling the sunroof apparatus 4 to the vehicle body. Further, the sunshade 9 can be inserted from behind the each of the left and right frame portions 7 after the cross member 8 is assembled to each of the left and right frame portions 7. The sunshade 9 can be attached thereto after the cross member 8 is assembled. That is, the sunshade can be prevented from being fouled at each of the assembling steps.

Furthermore, the sunshade 9 can easily be replaced during a state in which the sunroof apparatus 4 is assembled to the vehicle body. Thus, even in the case that the sunshade 9 age-deteriorates as a result of long-term use of the motor vehicle 1, the sunshade 9 can be replaced without detaching the motor 13 and the cross member 8. Consequently, the maintainability of the vehicle can be enhanced.

Moreover, in accordance with the vehicle sunroof structure according to this embodiment, the motor 13 is placed above the shade sliding rail 7c. Therefore, the members of the sunroof are not placed behind the rear end of the shade sliding rail 7c. Consequently, the sunroof can be configured in such a way as to be short in the longitudinal direction.

Further, the motor 13 is positioned to the outer side in the longitudinal direction of the end portion of the lid sliding rail 7b. Thus, the motor 13 does not protrude upwardly. The dimension in the vertical direction of the sunroof does not become large. That is, the space needed for the sunroof in the vehicle can be decreased. That is, a large space for passengers can be ensured.

Furthermore, in accordance with the vehicle sunroof structure according to this embodiment, the sliding rails 7b and 7c are separately formed, so that the loci in the longitudinal direction of the sliding rails 7b and 7c can be set independent from each other. Therefore, the sunshade insertion/removal space S is ensured. Further, the shade sliding rail 7c is formed so that the rearmost position of the sunshade 9 becomes a more rearward position, while the lid sliding rail 7b can be formed independent from the shade sliding rail 7c. That is, the position of the front end of the sunshade 9, of which rear end is at the rearmost position, is located at a more rearward place by setting the rearmost position of the sunshade 9 to be a more rearward one. Thus, the rear peripheral edge of the roof opening 3 can be set to be rearwardly enlarged. Furthermore, the designing of an optimum lid sliding rail 7b, that is, the designing of an optimum shape thereof for guiding the sunroof lids 5 and 6, and of a shape enabling the vehicle to ensure a larger indoor space, can be performed.

Incidentally, although it is described in the foregoing description of the aforementioned embodiment that the sunshade insertion/removal space S is defined behind the shade sliding rail 7c, the sunshade insertion/removal space may be defined forwardly of the shade sliding rail. Moreover, the sunshade may be adapted to be freely inserted or removed from the front of the shade sliding rail.

In this case, in the case that a roof brace serving as a roof member is present, it is sufficient to configure the vehicle sunroof structure so that the roof brace is placed above the sunshade insertion/removal space. Further, in the case that the motor is disposed in the front portion, it is preferable that the motor is placed above the moving locus of the sunshade. Further, in the case that a cross member connecting the front ends of the left and right frame portions, it is preferable to configure the cross member in such a way as to stride over the shade sliding rail and as to be above the moving locus of the sunshade. Further, preferably, the front end portions of the left and right frame portions are configured so that the end portion of the lid sliding rail is placed behind the end portion of the shade sliding rail, and that the motor is disposed forwardly of the end portion of the lid sliding rail. With these configurations, advantages similar to those of the aforementioned embodiment can be obtained.

Further, although it is described in the foregoing description of the embodiment that each of the left and right frame portions 7 is divided into the lid rail member 14 and the shade rail member 15, these members may be integrally formed.

Moreover, although it is described in the foregoing description of the embodiment that the motor 13 is installed on the bottom surface of the bracket 12 provided in such a way as to hang across the cross member 8 and the rear rail 11, the motor may be installed at the side of the roof panel 2 through the bracket. Even in this case, it is desirable that the motor 13 is disposed behind the lid sliding rail 7b, similarly as that of the aforementioned embodiment. Moreover, it is desirable to configure the motor 13 in such a way as to be disposed above the rearmost position of the sunshade 9.

Furthermore, although it is described in the foregoing description of the embodiment that the cross member 8 is provided at the side of the rear end of each of the left and right frame portions 7, the cross member 8 may be configured in such a way as to connect the central parts of the left and right frame portions. Additionally, although it is described in the foregoing description of the embodiment that the embodiment has two lids 5 and 6 for opening and closing the roof opening 3, the roof opening may be opened and closed only by one lid. Needless to say, other practical and constructional details may be suitably changed.

As described above in detail, according to the vehicle sunroof structure of the invention, there is no need for performing an operation of assembling the sunroof apparatus to the vehicle body during a state in which the sunshade is preliminarily attached thereto. In a factory, a step of attaching the sunshade can be adapted to be performed downstream of a step of assembling the sunroof apparatus to the vehicle body. That is, the sunshade can be prevented from being fouled at each of the steps of assembling the sunshade.

Further, even in the case that the sunshade age-deteriorates as a result of long-term use of a motor vehicle, the sunshade can be replaced without detaching various kinds of parts. Consequently, the maintainability of the vehicle can be enhanced.

What is claimed is:

1. A sunroof structure, configured by assembling a sunroof apparatus, the sunroof apparatus comprising:
   a pair of left and right frame portions provided on peripheral edges of a roof opening; and
   a shade sliding rail being downwardly concave and guiding a sunshade formed in each of the frame portions in a longitudinal direction, to a vehicle body, wherein:
   the vehicle body and the sunroof apparatus are so configured that the sunshade is freely inserted to and removed from the shade sliding rail during a state wherein the sunroof apparatus is incorporated into the vehicle body.

2. The sunroof structure according to claim 1, further comprising:
   a roof member disposed longitudinally of the roof opening of the vehicle body and extending laterally placed above a space through which the sunshade passes when inserted thereto or removed therefrom.

3. The sunroof structure according to claim 1, further comprising:
   a motor for driving a sunroof lid disposed above a moving locus of the sunshade.

4. The sunroof structure according to claim 3, wherein:
   the motor is disposed above a forefront position or a rearmost position, to which the sunshade is guided by the shade sliding rail.

5. The sunroof structure according to claim 3, further comprising:
   a lid sliding rail formed on each of the frame portions, wherein:
   at least one end of each of the frame portions is positioned so that an end portion of the lid sliding rail is positioned on a central side in a longitudinal direction from an end portion of the shade sliding rail; and
   the motor is placed on an outward side in a longitudinal direction from an end portion of the lid sliding rail.

6. The sunroof structure according to claim 5, wherein:
   the lid sliding rail is formed separately from the shade sliding rail.

7. The sunroof structure according to claim 1, further comprising:
   a cross member, which connects the pair of frame portions and extends laterally, striding over the shade sliding rail and being placed above a moving locus of the sunshade.

8. The sunroof structure according to claim 1, wherein:
   the roof opening is opened and closed by one lid.

9. The sunroof structure according to claim 1, wherein the sunshade is freely inserted to and removed from a rear of the shade sliding rail when the sunroof apparatus is incorporated into the vehicle body.

10. The sunroof structure according to claim 5, wherein a rear end of each of the frame portions is positioned so that the end portion of the lid sliding rail is positioned on the central side in the longitudinal direction from the end portion of the shade sliding rail.

11. The sunroof structure according to claim 1, further comprising a cross member connecting one set of rear sides of the pair of frame portions, extending laterally, striding over the shade sliding rail, and being placed above a moving locus of the sunshade.

12. The sunroof structure according to claim 1, wherein the vehicle body comprises a rear rail disposed longitudinally from the roof opening of the vehicle body and extending laterally above a space through which the sunshade passes when inserted thereto or removed therefrom.

13. The sunroof structure according to claim 12, wherein the rear rail is provided along an upper part of the vehicle body.

14. The sunroof structure according to claim 12, further comprising a roof trim detachably fixed to a bottom portion of the rear rail and disposed below the shade sliding rail, wherein the roof trim is detached from the rear rail to allow the sunshade to be inserted and removed from the shade sliding rail.

15. The sunroof structure according to claim 2, wherein the space through which the sunshade passes when inserted into or removed from the shade sliding rail extends obliquely downwardly from the shade sliding rail.

16. The sunroof structure according to claim 3, further comprising:

a lid sliding rail being downwardly concave and formed on each of the frame portions;

wherein the motor is placed on an outward side in the longitudinal direction from an end portion of the lid sliding rail.

17. The sunroof structure according to claim 16, wherein a curvature in the longitudinal direction of the lid sliding rail is different from a curvature in the longitudinal direction of the shade sliding rail.

18. The sunroof structure according to claim 16, wherein at least one end of each of the frame portions is positioned so that an end portion of the lid sliding rail is positioned on a central side in the longitudinal direction from an end portion of the shade sliding rail.

19. The sunroof structure according to claim 3, wherein the motor is disposed above an end of the shade sliding rail.

20. The sunroof structure according to claim 1, further comprising:

a lid sliding rail formed on each of the frame portions, the lid sliding rail being downwardly concave; wherein:

the roof opening is opened and closed by a first lid guided by a first portion of the lid sliding rail and a second lid guided by a second portion of the lid sliding rail;

wherein a curvature in the longitudinal direction of the first portion of the lid sliding rail is different from a curvature in the longitudinal direction of the second portion of the lid sliding rail.

21. The sunroof structure according to claim 20, wherein the shade sliding rail has a nearly uniform curvature in the longitudinal direction.

22. A sunroof structure, configured by assembling a sunroof apparatus, the sunroof apparatus comprising:

a pair of left and right frame portions provided on peripheral edges of a roof opening; and a shade sliding rail for guiding a sunshade formed in each of the frame portions in a longitudinal direction, to a vehicle body, wherein:

the vehicle body and the sunroof apparatus are so configured that the sunshade is freely inserted to and removed from the shade sliding rail during a state wherein the sunroof apparatus is incorporated into the vehicle body, and a rear rail of the vehicle body is disposed longitudinally from the roof opening of the vehicle body and extends laterally above a space through which the sunshade passes when inserted thereto or removed therefrom.

23. The sunroof structure according to claim 22, wherein the rear rail is provided along an upper part of the vehicle body.

24. The sunroof structure according to claim 22, further comprising a roof trim detachably fixed to a bottom portion of the rear rail and disposed below the shade sliding rail, wherein the roof trim is detached from the rear rail to allow the sunshade to be inserted and removed from the shade sliding rail.

* * * * *